(12) United States Patent
Seagle et al.

(10) Patent No.: US 7,054,113 B1
(45) Date of Patent: May 30, 2006

(54) READER/WRITER FOR MAGNETIC MEMORY

(75) Inventors: David John Seagle, Morgan Hill, CA (US); Mark David Thomas, Hollister, CA (US); Sandra Sankar, San Diego, CA (US); Pei Zou, Hayward, CA (US); Carlos Corona, Pleasanton, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 854 days.

(21) Appl. No.: 09/999,605

(22) Filed: Oct. 25, 2001

(51) Int. Cl.
*G11B 5/33* (2006.01)

(52) U.S. Cl. .................................................... 360/317
(58) Field of Classification Search ................ 360/317, 360/126, 244.1
See application file for complete search history.

(56) References Cited

U.S. PATENT DOCUMENTS

| | | | |
|---|---|---|---|
| 6,043,959 A * | 3/2000 | Crue et al. .................. 360/317 |
| 6,324,036 B1 * | 11/2001 | Dill et al. ................... 360/320 |
| 6,385,012 B1 * | 5/2002 | Sasaki ...................... 360/234.5 |
| 6,466,401 B1 * | 10/2002 | Hong et al. ................. 360/123 |
| 6,553,649 B1 * | 4/2003 | Santini ..................... 29/603.14 |
| 6,747,850 B1 * | 6/2004 | Chang et al. ............... 360/317 |

* cited by examiner

*Primary Examiner*—A. J. Heinz
(74) *Attorney, Agent, or Firm*—Jonathan E. Prejean, Esq.

(57) ABSTRACT

A method for manufacturing a reader/writer is provided having a substrate with an undercoat formed thereon. A first shield is formed over a portion of the undercoat and a pair of reader leads is formed over the first shield and undercoat. A read sensor is formed between the reader leads and a first pole/second shield is formed over the reader leads. A mid coat is formed over the undercoat and the reader leads. A second pole is formed over and in contact with the mid coat. A lead is formed over the second pole. A pedestal is formed over the reader lead and an overcoat is formed over the second pole and the lead and around the pedestal. A pad is then formed over the pedestal.

20 Claims, 4 Drawing Sheets

READER/WRITER FOR MAGNETIC MEMORY

TECHNICAL FIELD

The present invention relates generally to reader/writers and more particularly to improving lifetime reliability in reader/writers.

BACKGROUND ART

A large portion of the data storage in today's computers uses magnetic media typically in the form of a disk. Data is represented to a computer by a large number of bits (ones and zeroes) and stored on disks where each bit is represented by a transition, which results in a leakage magnetic field. In order to read or write the value of any given bit, a read/write transducer is used, which includes one portion for changing or writing to the disk and another portion for detecting or reading changes in the magnetic field from transitions.

In the write cycle, a large high frequency current is applied to the write coil, which magnetizes a yoke. The fringing field from a small gap in the yoke magnetizes the magnetic disk. The direction of the fringing field, and hence the magnetization of the disk switches when the current polarity is reversed. A transition is formed when the current polarity is reversed.

In the read portion, a magnetoresistive (MR) sensor that changes electrical resistance in response to a magnetic field is employed. Older sensors utilize the anisotropic magnetoresistive (AMR) effect where a read element resistance varies in proportion to the square of the cosine of the angle between the magnetization in the read element and the direction of a sense current flowing through the read element. Data is read by the sensor from magnetic transitions recorded in the media. The magnetic field, resulting from a transition, causes a change in the direction of the magnetization in the read element. The new magnetization direction changes the resistance of the read element with a corresponding change in the sense current or voltage.

The sensors currently used exhibit a form of magnetoresistance called giant magnetoresistance (GMR). The GMR effect occurs in multilayer thin films of alternating ferromagnetic and nonferromagnetic metals. A subset of the GMR device is the spin valve in which two ferromagnetic (FM) layers, a "free layer" and a "pinned layer", are separated by a non-magnetic spacer layer. The resistance of a GMR film changes according to the cosine of the angle between the magnetization of the FM layers. Hence, when the magnetization directions in the two layers are parallel the resistance is at a minimum; when the magnetization directions are anti-parallel, the resistance is at a maximum. As the magnetic disk is rotating, leakage fields from the written transitions change the relative angle between the directions of magnetization of the pinned and free layers, which in turn, result in a change in electrical resistance of the sensor. For a fixed DC current through the sensor, this translates into a change in readback voltage. Thus, the readback voltage consists of a positive or negative voltage pulse for each written transition.

For maximum readback signal, the maximum DC current that does not degrade the sensor is required. Degradation occurs due to temperature rise resulting from Joule heating in the sensor. Higher currents imply higher temperatures, which translates into a decrease in lifetime reliability.

Further, this problem has become more severe as higher density magnetic media is required which requires smaller devices, which therefore have increased current density and greater heating problems. If the current flow is decreased, the devices are less sensitive and thus less able to detect the data on high-density magnetic media. The demand for higher reader sensitivity is also driven by weaker magnetic fields from the media with increasing areal density (capacity per unit area).

Solutions to these problems have been long sought, but have long eluded those skilled in the art.

DISCLOSURE OF THE INVENTION

The present invention provides a method for manufacturing a reader/writer having a substrate with an undercoat formed thereon. The read head is formed first. In the deposition and/or patterned order this consists of a first shield, an insulating gap, a read sensor and leads, a second insulating gap, and a second shield. Next, the write head is formed. This consists of a first pole, which is the same geometry as the second read shield, but electrically separated by a piggyback gap layer. Next the pedestal is formed. The following layer is the coil. However, before the coil is deposited, the entire structure is planarized. For this planarization step, the entire wafer is coated with a thick insulating layer, referred to as the mid coat, which is polished to expose the pedestal. The coil is deposited into a flat surface, the coil is insulated, and then a top pole is deposited. Finally the whole structure is covered with an overcoat.

Since the head consists of metallic and dielectric layers, there are capacitances between the writer and reader leads. The electrical impedance across a capacitor decreases with increasing frequency. As a result of the capacitance, at high frequencies, a significant portion of the write current flow through the reader. Typical values for a operating write and read currents are 40 mA and 5 mA, respectively. Therefore, only a few percent of the write current flowing through the reader can lead to a considerably large decrease in lifetime reliability.

The above and additional advantages of the present invention will become apparent to those skilled in the art from a reading of the following detailed description when taken in conjunction with the accompanying drawings

BEST MODE FOR CARRYING OUT THE INVENTION

Figure 1:
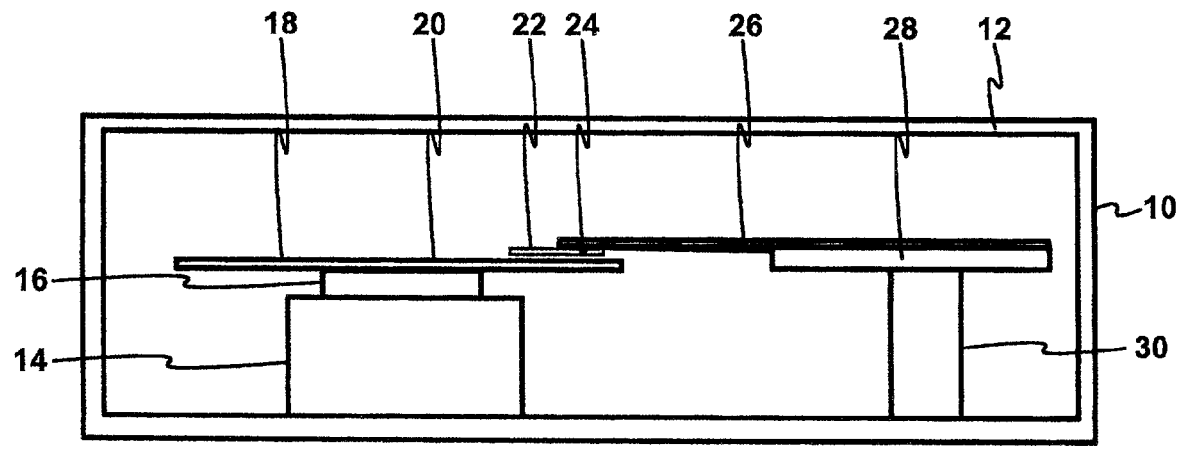
FIG. 1 is a side view schematic of a disk drive system using the present invention.

Referring now to FIG. 1, therein is shown a magnetic recording disk drive system 10. The system 10 has a housing 12 on which a disk drive motor 14 is mounted. The disk drive motor 14 is a high-speed motor having a hub 16 on which one or more magnetic recording disks, such as a magnetic recording disk 20, is mounted.

The term "horizontal" as used herein for the system 10 is defined as a plane parallel to the conventional plane or surface of the recording disk regardless of the orientation of the disk. The term as used herein for the sensor used in the system 10 is defined as a plane parallel to the surface upon which an initial layer is deposited regardless of the subsequent orientation of the surface. The term "longitudinal" as used herein is defined as parallel to the direction of movement of the disk 20. The term "vertical" refers to a direction perpendicular to the horizontal as just defined. Terms, such as "on", "above", "higher", "lower", "over", "top", and "under", are defined with respect to the horizontal plane.

The disk 20 is generally covered by a lubricant to minimize friction during start-up conditions. During operation, a film of air on the disk 20 lifts an air-bearing slider 22 away from the surface due to the rotation of the disk 20. The air-bearing slider 22 includes a substrate into which aerodynamic pads are etched. The active part of the air-bearing slider 22 is a reader/writer 24 according to the present invention is mounted to the air-bearing slider 22.

The air-bearing slider 22 with the reader/writer 24 are held by a suspension arm 26, which provides a spring action to hold the air-bearing slider 22 within a specified range of distances from the surface of the disk 20. The suspension arm 26 is supported by an arm 28, which is rotated by an actuator 30. As the disk drive motor 14 rotates the disk 20, the actuator 30 moves the reader/writer 24 radially with respect to the surface of the disk 20 to access different data tracks thereon.

Figure 2:
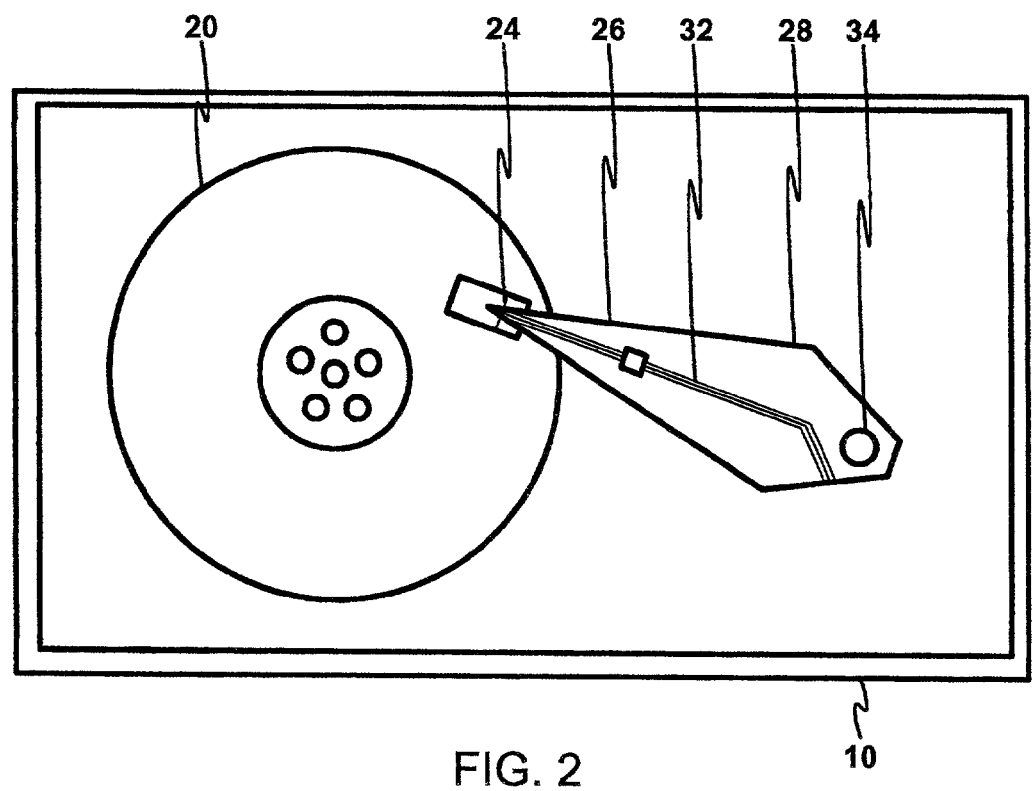
FIG. 2 is a simplified top view of the system incorporating the present invention.

Referring now to FIG. 2, therein is shown the top view of the system 10 with the reader/writer 24 at the end of the suspension arm 26 and connected by wires 32 to read/write circuitry (not shown). A pivot 34 allows the arm 28 to turn in order to read/write to various tracks on the disk 20.

Figure 3:
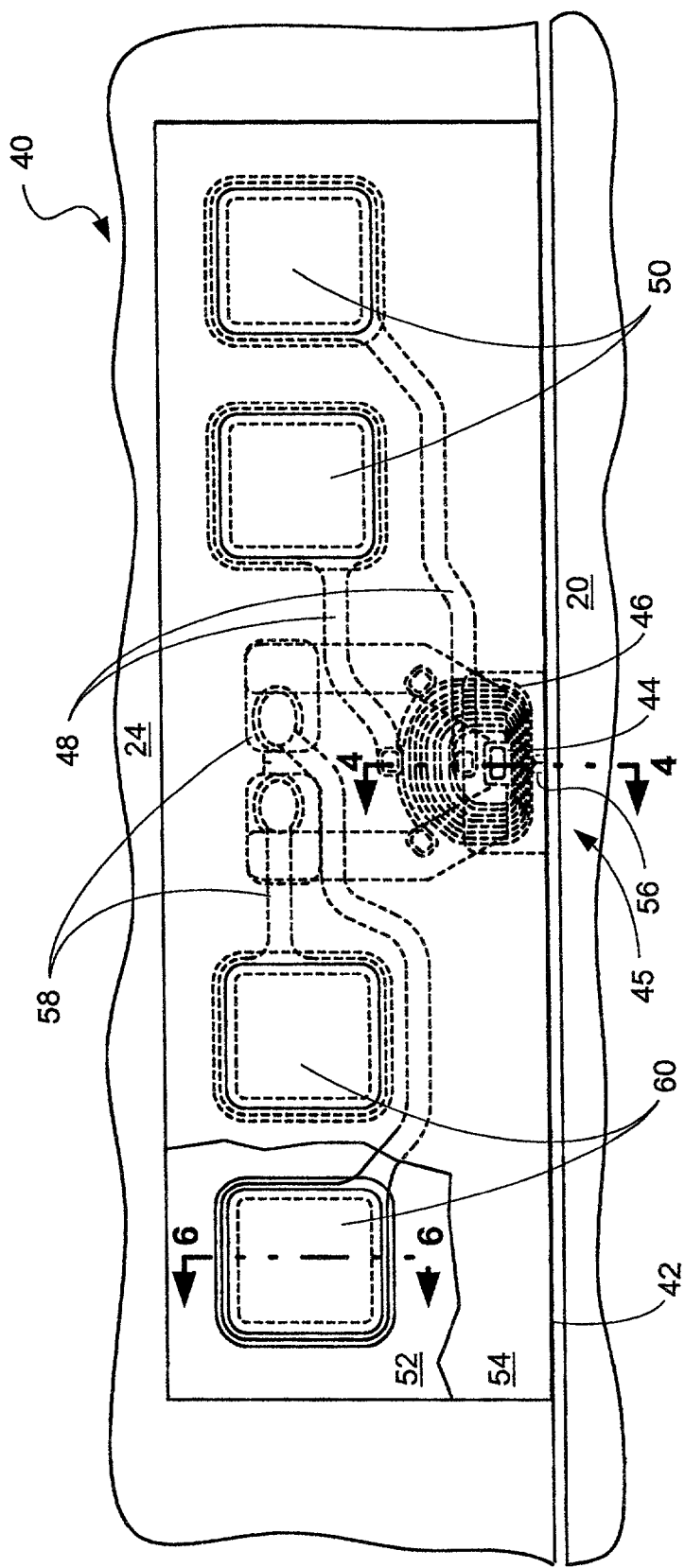
FIG. 3 is a view of a reader/writer of the present invention mounted on a substrate.

Referring now to FIG. 3, therein is shown a read/write transducer 40, which is part of the reader/writer 24. The read/write transducer 40 has an air-bearing surface 42, which rides on an air film above the surface of the disk 20.

The read/write transducer 40 includes a write coil 46 wrapped around a magnetic yoke 44. The coil 46 is connected by a pair of writer leads 48 to a pair of writer pad stacks 50. The writer pad stacks 50 are formed over an undercoat 52.

The read/write transducer 40 also includes a read sensor 56 (shown in FIG. 4), which is the anisotropic magnetoresistive (AMR), giant magnetoresistance (GMR), spin valve, or spin-dependent tunneling (SDT) sensor. The read sensor 56 is connected by a pair of reader leads 58 to a pair of reader pad stacks 60.

Figure 4:
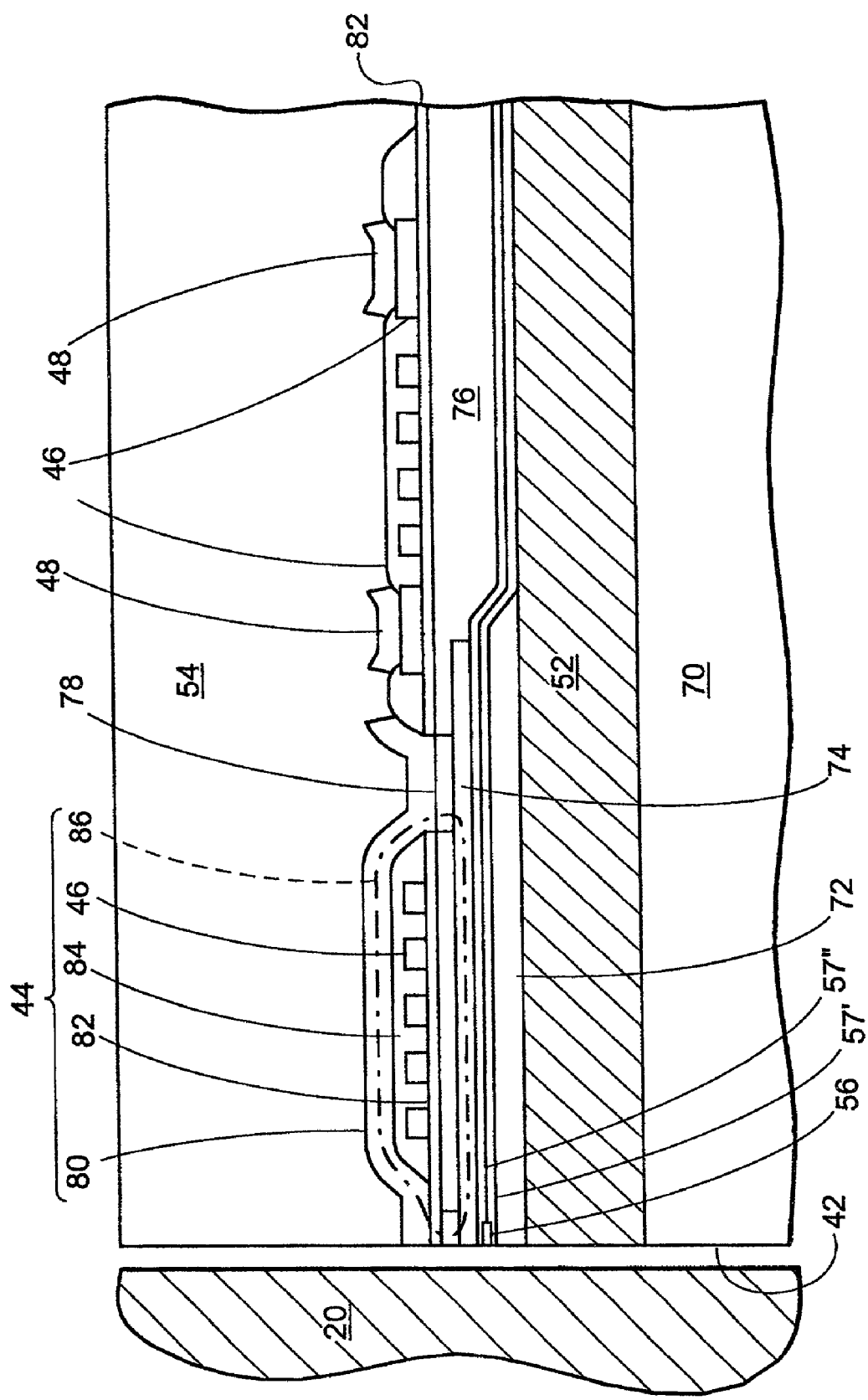
FIG. 4 is a partial cross-section view of the reader/writer structure of FIG. 3.

Referring now to FIG. 4, therein is shown a partial cross-section of the read/write transducer 40 along line 4—4 of FIG. 3.

Above the undercoat 52 is a first shield 72. The reader leads 58 are in front of and behind the read sensor 56 and, thus, are not shown in FIG. 4. Below and above the read sensor 56 are first and second gaps 55 and 57, generally of $Al_2O_3$. A first pole/second shield layer 74 is above the second gap 57. The first pole/second shield 74 is both the first pole for the write circuit 44 and the second shield for the read sensor 56.

A mid coat 76 is disposed over the first pole/second shield layer 74 and the second gap 57. A magnetic bridge 78 extends through the mid coat 76 and is connected to a second pole 80 of the write circuit 44.

Between the two poles is a non-magnetic write gap 82 (where the writing actually occurs)

The second pole 80 encapsulates the write coil 46. An insulator 84 electronically isolates the write coil 46. The overcoat 54 is deposited over the second pole 80, the encapsulant 84, and the writer leads 48.

In operation, when a current is provided through the writer leads 48, a magnetic field 86 is produced. This magnetic field 86 follows the magnetic circuit of the poles except at the air-bearing surface 42 where it leaks out of the write gap into the disk 20. This fringing field magnetizes areas on the disk 20. When a current is provided through the reader leads 58 of FIG. 3, the read sensor 56 senses magnetic bits on the disk 20.

The substrate 70 is a conductive material such as a composite of aluminum oxide and titanium carbide ($Al_2O$/TiC). The undercoat 52 is a dielectric material such as alumina ($Al_2O_3$). The writer leads 48 and the reader leads 58 are of a conductive material layer 72 such as copper (Cu). The mid coat 76 is a dielectric material such as $Al_2O_3$. The overcoat 54 is also a dielectric material such as $Al_2O_3$. The first shield 72 and the first pole/second shield layer 74 are made of a magnetic material, such as permalloy ($Ni_{80}Fe_{20}$).

Figure 5:
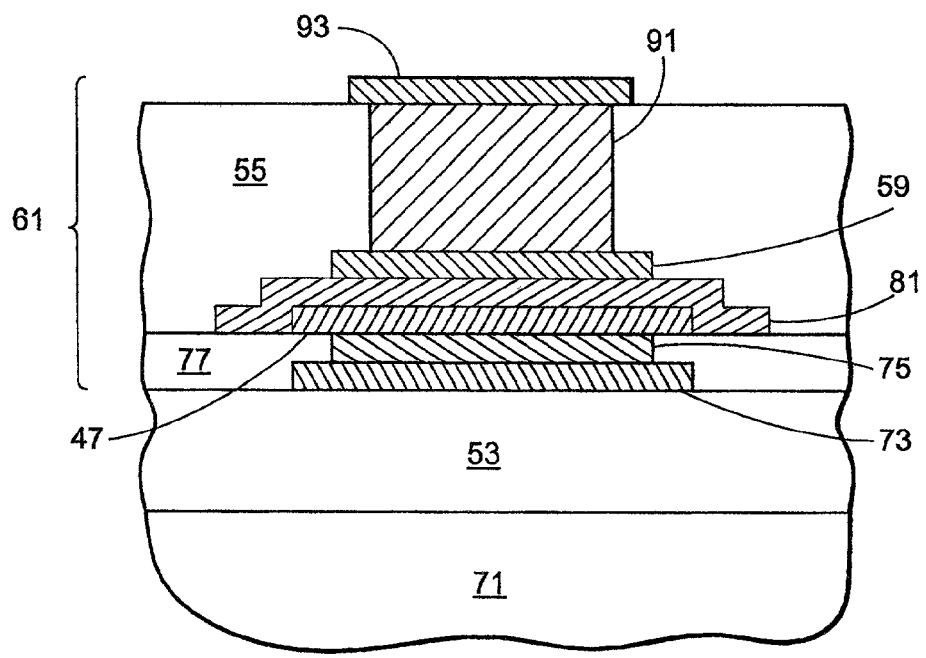
FIG. 5 (PRIOR ART) is a partial cross-section view of a prior art reader pad stack structure.
Figure 6:
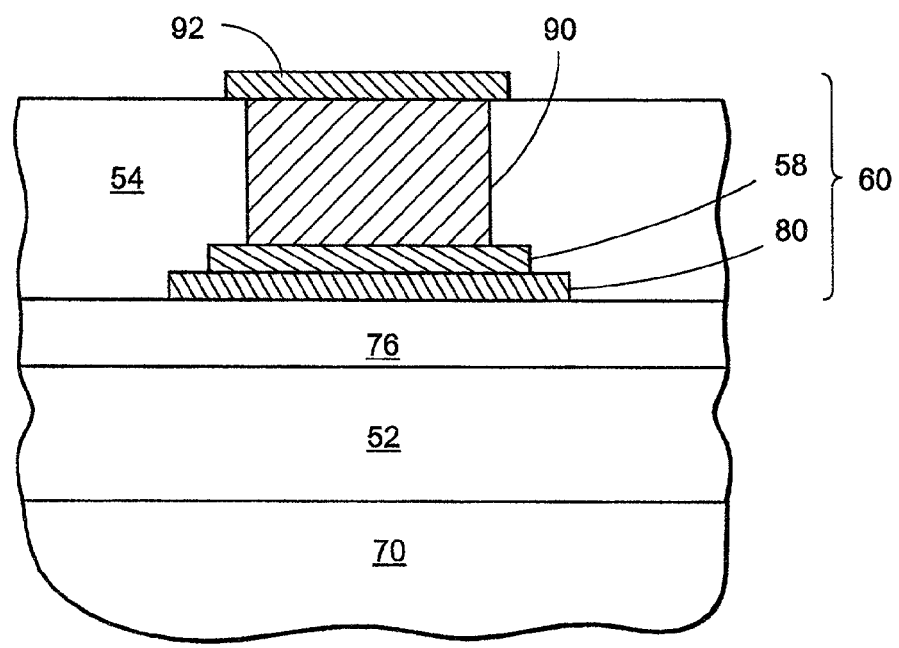
FIG. 6 is a partial cross-section view along line 6—6 of FIG. 3 of a reader pad stack structure according to the present invention.

Referring now to FIG. 5 (PRIOR ART), therein is shown a partial cross-section of a reader or writer pad stack 61 similar to the structure of the present invention shown in FIG. 6.

A substrate 71 has an undercoat 53 deposited thereon. First shield material 73 is deposited on the undercoat 53. First pole/second shield material 75 is above the first shield 73 and both are embedded in a mid coat 77. At this stage the entire wafer is planarized.

Coil material 47 is deposited and then covered by a second pole material 81. A layer deposited at the same time as the writer interconnect (center tap) 59 is above the second pole material 81. An overcoat 55 is deposited and processed for formation of a pedestal 91 in contact with the writer interconnect 59. A pad 93 is then subsequently deposited over the pedestal 91.

It should be noted that the first shield material 73 and the first pole/second shield material 75 are disposed in the mid coat 77 and the reader pad stack 61 is separated from the substrate 71 only by the undercoat 53.

Referring now to FIG. 6, therein is shown a partial cross-section taken along line 6—6 of FIG. 3 of one of the reader pad stacks 60 of the present invention.

The substrate 70 has the undercoat 52 deposited thereon. The mid coat 76 is deposited over the undercoat 52. Material deposited at the same time as the second pole 80 is the first part of the reader pad stack 60 to be deposited and it is on the mid coat 76. One of the reader leads 58 is formed over the second pole 80.

The overcoat 54 is deposited and processed for formation of a pedestal 90 in contact with the reader lead 58. A pad 92 is then subsequently deposited over the pedestal 90. The pedestal 90 is a conductive material such as copper and the pad 92 is a protective material such as gold (Au).

It should be noted that the first shield layer 72 and the first pole/second shield layer 74 are not present in the mid coat 76 in the reader pad stack 60 and, thus, the reader pad stack 60 is distal from the substrate 70.

The writer pad stacks 50 are the same as the reader pad stacks 60 with the exception that the writer leads 48 are connected in place of the reader leads 58. Both use the same materials, which are deposited, masked, and processed during the same steps, but they are physically located in different parts of the read/write transducer 40 and, as a consequence, they are actually physically different structures.

In the present invention, the writer pad stacks 50 and the reader pad stacks 60 are placed distally from the substrate 70 and the previous portions of the first shield 72, the first pole/second shield 74, and the coil 46 are eliminated either by masking to avoid deposition in the pad stack areas or by removal after deposition.

The present invention is the result of extensive investigation into the sources of heat generation in the prior art reader/writer. Since the reader pad stacks 61 and the writer pad stacks (not shown but similar to the reader pad stacks 61) are spaced far apart on the substrate 71, experts in the art believed that pad stack placement and configuration could not have any significant impact on reader/writer operation.

However, it was unexpectedly discovered during the investigation that, as a consequence of the conductivity of the substrate 71 and the high dielectric material of the undercoat 53, a strong capacitive coupling effect caused a high degree of high frequency current shunting between the reader pad stacks 61 and the writer pad stacks. This frequency dependant shunting was unexpectedly discovered to be a major heat source in the reader/writer.

During the write process, although the writer pad stacks are electrically isolated from the reader pad stacks 61 from a direct current standpoint, strong alternating current coupling occurred between the two sets of pad structures and electrical current was transferred from the writer pad stacks into the reader pad stacks 61 to cause heat generation in the entire reader/writer. As higher frequencies are used for faster data rates at higher density, more current is passed into the reader pad stacks 61, the reader leads 59, and into the read sensor 56, which leads to additional heating and lifetime degradation of the reader.

Simulations have shown that under operating conditions (i.e. a steady state current of 40 milliamp (mA) through the coil with a 0.5 nanosecond (ns) rise time), there is a transient current with a peak-to-peak amplitude of 9.0 milliamp (mA) through the read sensor.

One possible solution to reduce capacitive coupling is to increase the thickness of the undercoat 53. However, increasing the thickness increases pole tip recession (PTR), which is the preferential erosion during manufacturing because of the relative hardnesses of the substrate and the undercoat. The preferential erosion results in variation in fly-height between the read sensor and the magnetic media. Increasing the undercoat thickness also reduces the heat flow to the substrate, which reduces cooling of critical components and reduced life expectancy.

As a result of the investigation, it was also discovered that relatively minor and cost effective changes in keeping with the previous process flow allowed the bottoms of the reader pad stacks 60 and the writer pad stacks 50 to be substantially further away from the substrate 70 and, since the capacitance drops proportionally to the distance, the amount of capacitive coupling could be reduced proportionately.

In one example, the bottoms of the reader pad stacks 60 and the writer pad stacks 50 are built on top of the mid coat 76 during the second pole deposition. This increases the substrate-to-pad distance from 3.2 micron (μm) to 8.7 micron (μm), which decreases the capacitance between the pad and substrate by 58% (from 0.520 pF to 0.216 pF.) The rest of the capacitance matrix is the same. With the present invention, the transient current induced in the read/write transducer 40 decreases by 36% (from 9 milliamp (mA) to 6 milliamp (mA)). Since the power dissipated varies as the square of the current, the power dissipated in the read/write transducer 40 is reduced by 56%.

The process steps are exactly the same as in the prior art, and the second pole metal of nickel iron (NiFe) is deposited on the mid coat 76 of alumina so no additional contaminants are introduced during the planarization of the process and no adhesion problems introduced.

As would be evident to those skilled in the art as a result of the disclosure above, to further reduce the power due to capacitive coupling, the first shield 72, the first pole/second shield 74, the reader leads 58, and the writer leads 48 can be elevated by obvious expedients to be further from the substrate 70 in non-essential areas proximate the reader pad stacks 60 and the writer pad stacks 50.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the spirit and scope of the included claims. All matters hitherto-fore set forth herein or shown in the accompanying drawings are to be interpreted in an illustrative and non-limiting sense.

The invention claimed is:

1. A method for manufacturing a reader/writer, comprising:
   providing a substrate;
   forming an undercoat over the substrate;
   forming a first shield over a portion of the undercoat;
   forming a first reader lead over the first shield;
   forming a read sensor over the first reader lead;
   forming a second reader lead over the read sensor;
   forming a first pole/second shield over the second reader lead;
   forming a mid coat over the undercoat and a portion of the first pole/second shield;
   forming a coil over the first pole/second shield;
   forming a second pole over the coil;
   forming first and second leads connected to the coil;
   forming an overcoat over the first and second leads; and
   forming a pad stack over the mid coat and not in the mid coat including:
      a pole selected from a group consisting of the first pole/second shield and the second pole;
      a lead selected from a group consisting of the first and second reader leads and the first and second writer leads;
      a pedestal connected to the pole and lead; and
      a pad connected to the pedestal.

2. The method as claimed in claim 1, wherein forming the pad stack forms the pole on the mid coat.

3. The method as claimed in claim 1, wherein forming the first and second reader leads forms the first and second reader leads distal from the substrate proximate the pad stack.

4. The method as claimed in claim 1 wherein forming the first and second writer leads forms the first and second reader leads distal from the substrate proximate the pad stack.

5. The method as claimed in claim 1 wherein forming the first shield and the first pole/second shield forms the first shield and the first pole/second shield distal from the substrate proximate the pad stack.

6. A method for manufacturing a reader/writer, comprising:
   providing a substrate;
   forming an undercoat in contact with the substrate;
   forming a first shield in contact with a portion of the undercoat;
   forming a first reader lead in contact with the first shield;
   forming a read sensor in contact with the first reader lead;
   forming a second reader lead in contact with the read sensor;
   forming a first pole/second shield in contact with the second reader lead;
   forming a mid coat in contact with the undercoat and a portion of the first pole/second shield;
   forming a coil in contact with the first pole/second shield;
   forming a second pole in contact with r the coil;
   forming first and second leads connected to the coil;
   forming an overcoat in contact with the first and second leads; and
   forming a pad stack in contact with the mid coat and not in the mid coat including:
      a pole selected from a group consisting of the first pole/second shield and the second pole;
      a lead selected from a group consisting of the first and second reader leads and the first and second writer leads;
      a pedestal connected to the pole and lead; and
      a pad connected to the pedestal.

7. The method as claimed in claim 1, wherein forming the pad stack forms the pole in contact with the mid coat.

8. The method as claimed in claim 1, wherein forming the first and second reader leads forms the first and second reader leads above the mid coat proximate the pad stack.

9. The method as claimed in claim 1 wherein forming the first and second writer leads forms the first and second reader leads above the mid coat proximate the pad stack.

10. The method as claimed in claim 1 wherein forming the first shield and the first pole/second shield forms the first shield and the first pole/second shield above the mid coat proximate the pad stack.

11. A reader/writer, comprising:
   a substrate;
   an undercoat over the substrate;
   a first shield over a portion of the undercoat;
   a first reader lead over the first shield;
   a read sensor over the first reader lead;
   a second reader lead over the read sensor;
   a first pole/second shield over the second reader lead;
   a mid coat over the undercoat and a portion of the first pole/second shield;
   a coil over the first pole/second shield;
   a second pole over the coil;
   first and second leads connected to the coil;
   an overcoat over the first and second leads; and
   a pad stack over the mid coat and not in the mid coat including:
      a pole selected from a group consisting of the first pole/second shield and the second pole;
      a lead selected from a group consisting of the first and second reader leads and the first and second writer leads;
      a pedestal connected to the pole and lead; and
      a pad connected to the pedestal.

12. The method as claimed in claim 1, wherein the pad stack has the pole on the mid coat.

13. The method as claimed in claim 1, wherein the first and second reader leads are distal from the substrate proximate the pad stack.

14. The method as claimed in claim 1 wherein the first and second reader leads are distal from the substrate proximate the pad stack.

15. The method as claimed in claim 1 wherein the first shield and the first pole/second shield are distal from the substrate proximate the pad stack.

16. A reader/writer, comprising:
   a substrate;
   an undercoat in contact with the substrate;
   a first shield in contact with a portion of the undercoat;
   a first reader lead in contact with the first shield;
   a read sensor in contact with the first reader lead;
   a second reader lead in contact with the read sensor;
   a first pole/second shield in contact with the second reader lead;
   a mid coat in contact with the undercoat and a portion of the first pole/second shield;
   a coil in contact with the first pole/second shield;
   a second pole in contact with r the coil;
   first and second leads connected to the coil;
   an overcoat in contact with the first and second leads; and
   a pad stack in contact with the mid coat and not in the mid coat including:
      a pole selected from a group consisting of the first pole/second shield and the second pole;
      a lead selected from a group consisting of the first and second reader leads and the first and second writer leads;
      a pedestal connected to the pole and lead; and
      a pad connected to the pedestal.

17. The method as claimed in claim 1, wherein the pad stack has the pole in contact with the mid coat.

18. The method as claimed in claim 1, wherein the first and second reader leads are above the mid coat proximate the pad stack.

19. The method as claimed in claim 1 wherein the first and second reader leads are above the mid coat proximate the pad stack.

20. The method as claimed in claim 1 the first shield and the first pole/second shield are above the mid coat proximate the pad stack.

* * * * *